United States Patent [19]
Haynes

[11] Patent Number: 5,931,483
[45] Date of Patent: Aug. 3, 1999

[54] BOWLING CADDY

[76] Inventor: David Lee Haynes, P. O. Box No. 1298, Kemah, Tex. 77565

[21] Appl. No.: 09/020,686

[22] Filed: Feb. 9, 1998

[51] Int. Cl.⁶ ...................................................... B62B 1/12
[52] U.S. Cl. .................. 280/47.19; 280/47.2; 280/47.28; 280/47.35
[58] Field of Search ............................ 280/35, 641, 651, 280/654, 47.19, 47.2, 47.28, 47.29, 47.34, 47.35, 62; 248/129

[56] References Cited

U.S. PATENT DOCUMENTS

| | | | |
|---|---|---|---|
| D. 118,060 | 12/1939 | Smith | 280/47.19 X |
| D. 249,492 | 9/1978 | Morley | D12/33 |
| 2,390,640 | 12/1945 | Carlson | 280/47.19 |
| 3,104,889 | 9/1963 | Branch, Jr. | 280/47.19 |
| 3,655,212 | 4/1972 | Krass et al. | 280/47.2 X |
| 3,892,429 | 7/1975 | Dalmy | 280/655 |
| 4,009,891 | 3/1977 | Jensen | 280/47.2 X |
| 4,220,346 | 9/1980 | Geschwender | 280/47.18 |
| 4,258,826 | 3/1981 | Murray | 280/47.28 X |
| 5,074,571 | 12/1991 | Reese | 280/47.19 |
| 5,192,092 | 3/1993 | DiBenedetto | 280/654 |

*Primary Examiner*—J J Swann
*Assistant Examiner*—Michael Mar
*Attorney, Agent, or Firm*—John S. Schneider

[57] ABSTRACT

A foldable-unfoldable bowling caddy has two spaced apart, parallel, generally vertically extending support legs mounted on wheels. A series of spaced apart flat forward racks rotatable to and from a folded position aligned with the two parallel legs to and from an unfolded horizontal position are attached to the two parallel legs. A third leg is pivotally connected to the two parallel legs and is movable to and from a folded position adjacent the two parallel legs to and from an angular position that forms a tripod with the two parallel legs. A rear rack is also connected to the two parallel legs and is rotatable to and from a folded position extending along the plane of the two parallel legs to and from an unfolded horizontally extending position. The third leg is releasably pinned to the rear rack when both are in their unfolded positions. A swivel ball is attached to the lower end of the third leg. Each rack contains seat openings for seating bowling balls. When in their horizontal positions the racks form a stepwise configuration.

13 Claims, 4 Drawing Sheets

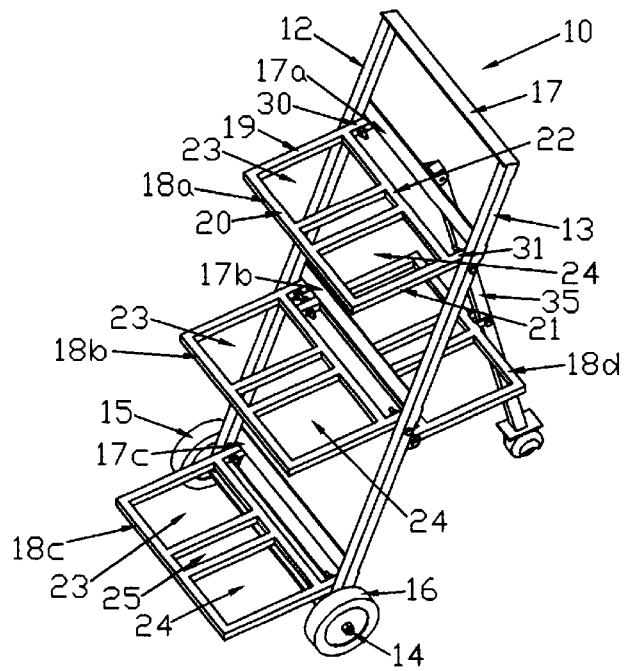
FIG. 1
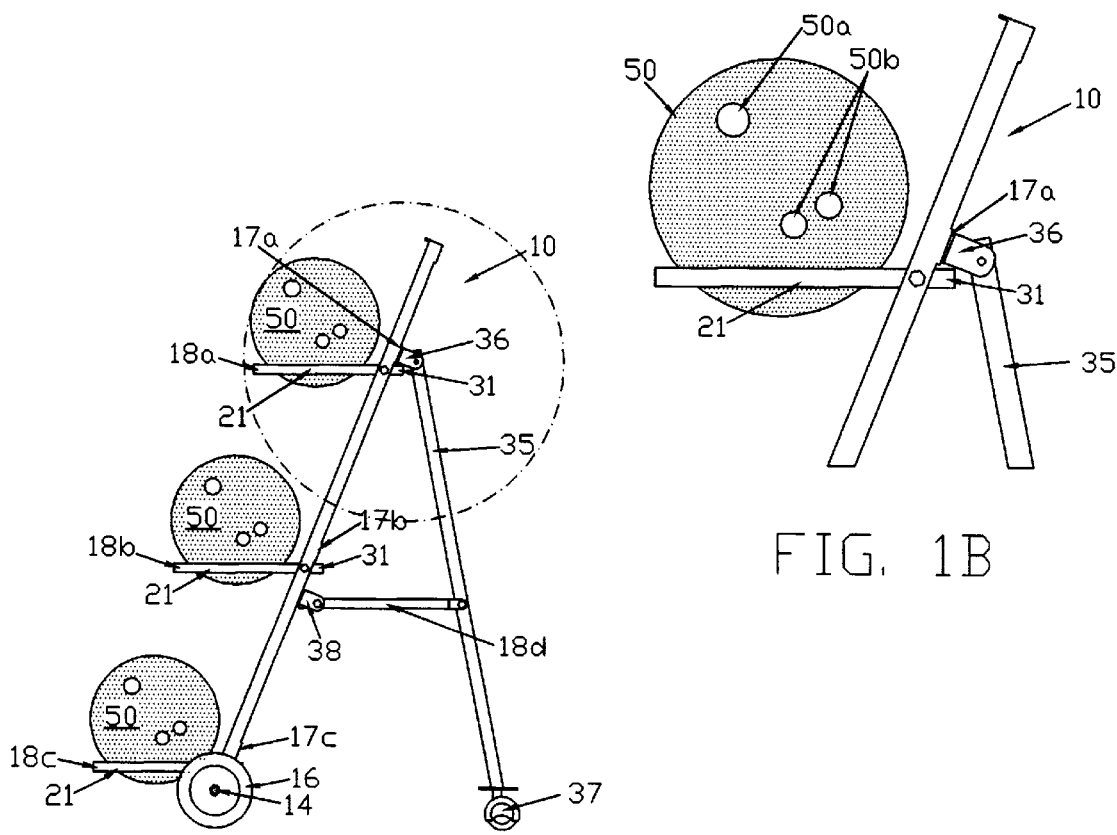
FIG. 1A
FIG. 1B

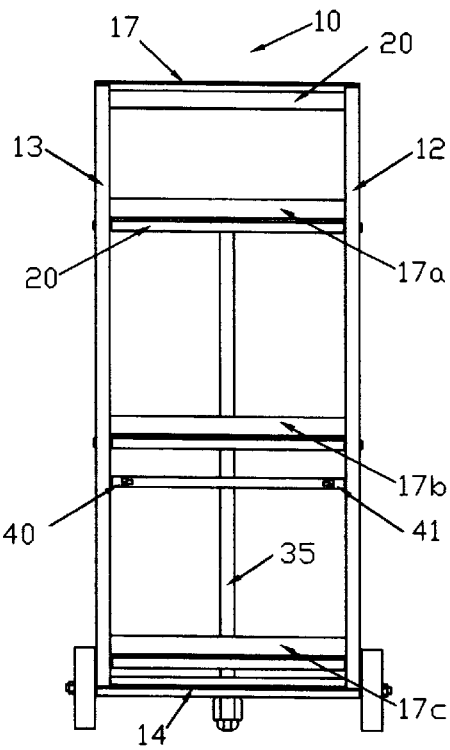
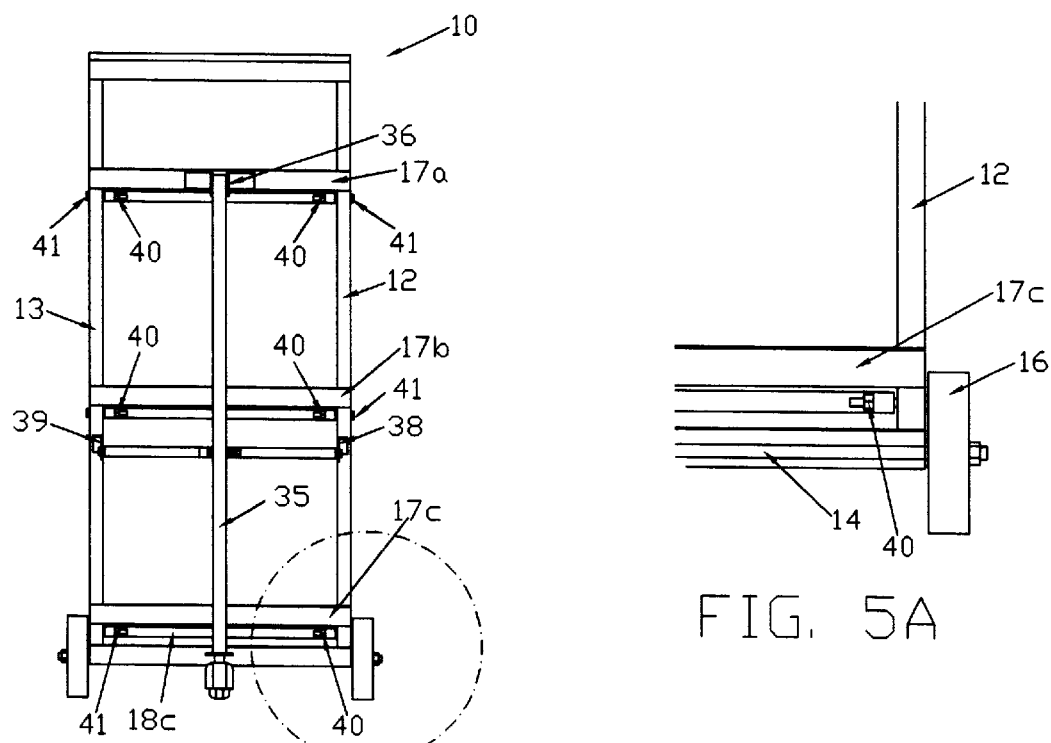

BOWLING CADDY

FIELD OF THE INVENTION

The bowling caddy of the present invention generally concerns mobile carts for transporting and storing a plurality of bowling balls. More specifically, the invention concerns a mobile frame to which a number of unfoldable-foldable racks for seating bowling balls are attached.

BACKGROUND OF THE INVENTION

Many bowlers, especially tournament bowlers, need two or more bowling balls each time he or she bowls in order to satisfy various bowling needs such as the use of different bowling balls on different bowling lanes and the use of different bowling grips and the use of a different bowling ball for spares and a different bowling ball for strikes, et cetera. The bowling caddy of this invention satisfies such needs by providing a mobile tote cart designed to hold up to four double ball bags or eight individual bowling balls or any combination thereof. In addition, this bowling caddy has other attractive features for the bowler e.g. the bowler has ready visual and physical access to all of the bowling balls that are on the caddy and the caddy is readily movable over most surfaces—carpet, wood floors, concrete, asphalt—found in and outside bowling facilities. The latter feature permits the bowler to move many bowling balls between the parking lot outside the bowling center and the lanes inside the bowling center with ease. That is important because individual bowlers, especially senior citizens, are limited in the amount of bowling equipment they themselves can physically carry. Another significant feature of this bowling caddy is that it is collapsible to a compactness that takes up little room when stored and that permits it to be easily transported by automobile, train and airplane. The foregoing features are not found in the prior art.

Movable carts capable of carrying one or more bowling balls are known but none has the features and capabilities of this bowling caddy. In U.S. Pat. No. 5,074,571 entitled "Spare Bowling Ball Carrier", issued to Reese, a mobile multiple bowling ball carrier is disclosed. However, the Reese apparatus is not foldable or collapsible for transport or storage purposes and is capable of carrying, at most, only three bowling balls that are not easily accessible or exposed to the bowler. In U.S. Des. Pat. No. 249,492 entitled "Dual Bowling Ball Caddy", issued to Morley, a simple dolly on wheels provided with a handle for transporting two bowling balls is disclosed. Such apparatus lacks the features set forth above that distinguish the bowling ball carrier described in this patent. A few other mobile, load carrying carts or dollies that are not sufficiently relevant to discuss in any detail are disclosed in: U.S. Pat. No. 5,192,092 entitled "Recycling Bin Cart", issued to DiBennedetto; U.S. Des. Pat. Entitled "Fisherman's Cart, or Similar Article", issued to Thomas; U.S. Pat. No. 3,892,429 entitled "Load-Carrying Push-Carriage", issued to Dalmy; and U.S. Pat. No. 4,220,346 entitled "Utility Cart", issued to Geschwender.

SUMMARY OF THE INVENTION

This bowling caddy utilizes two spaced apart, parallel, longitudinally and generally vertically extending support legs connected together by cross-bars at longitudinally or vertically spaced apart intervals and a longitudinally and generally vertically extending third or swivel leg pivotally attached to one of the cross-bars. The lower ends of the two parallel legs are supported on means for facilitating movement of the caddy. A plurality of vertically spaced apart front racks are connected to and between the parallel legs. Each front rack is pivotal in one lateral (forward) direction downwardly to a horizontal open, unfolded position and upwardly to a folded, closed position. A rear rack is connected to the parallel legs and is pivotal downwardly in an opposite (rearward) direction to a horizontal open, unfolded position and upwardly to a folded, closed position. Each rack contains seats for bowling balls. The third leg is releasably attached to the rear rack and is movable inwardly to a folded or closed position adjacent the two parallel legs when released from the rear rack and outwardly to an unfolded or open horizontal position when attached to the rear rack to form a tripod with the two parallel legs.

BRIEF DESCRIPTION OF THE DRAWINGS

FIG. 1 is a perspective view showing the bowling caddy in fully open, unfolded position;

FIG. 1A is a schematic side view of the bowling caddy shown in FIG. 1 to which bowling balls have been added;

FIG. 1B is an enlarged view of the circled portion of FIG. 1A;

FIG. 4 is a front view of the bowling caddy shown in FIG. 3;

FIG. 5 is a rear view of the bowling caddy shown in FIG. 3;

FIG. 5A is an enlarged view of the circled portion of FIG. 5;

DESCRIPTION OF THE PREFERRED EMBODIMENTS

Figure 2:
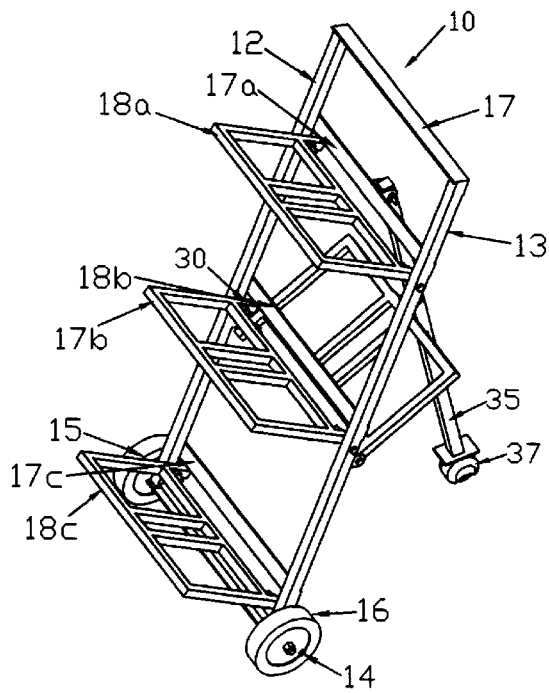
FIG. 2 is a perspective view showing the bowling caddy in partially closed position.
Figure 6:
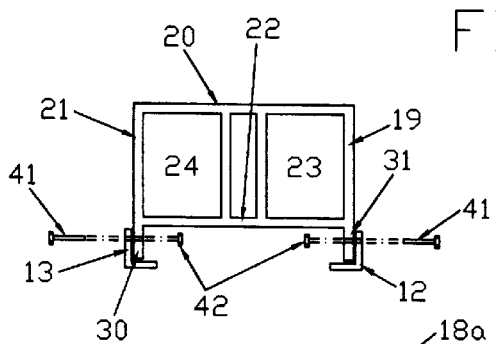
FIG. 6 is a top view of one of the forward racks in the open position.
Figure 3:
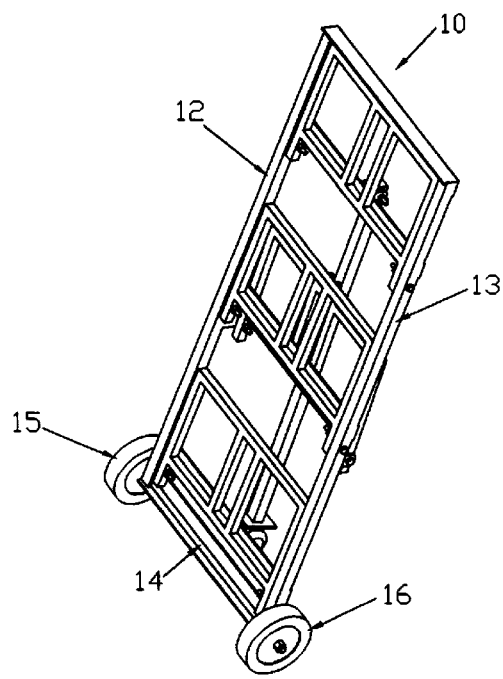
FIG. 3 is a perspective view showing the bowling caddy in fully closed, folded position.
Figure 3A:
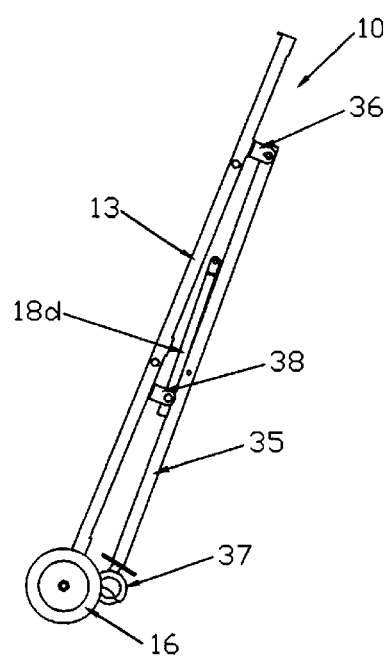
FIG. 3A is a schematic side view of the bowling caddy shown in FIG. 3.

Referring to the Figs. There is shown an unfoldable (for use)-foldable (for storage) mobile bowling caddy or cart 10 capable of transporting up to eight bowling balls 50, three of which are illustrated in FIG. 1A. Cart 10 includes two longitudinally and generally vertically extending spaced apart, parallel support legs 12 and 13 connected at their lower ends to an axle 14 the ends of which are journaled in bearings in wheels 15 and 16. The upper ends of legs 12 and 13 are connected by a tubular cross-bar 17 which may be used as a handle for pushing or pulling the caddy. Additional vertically spaced cross-bars 17a, 17b and 17c are connected to and between legs 12 and 13. Three vertically spaced rectangularly shaped racks or shelves, generally designated 18 and specifically 18a, 18b and 18c, are each pivotally connected to the interior of legs 12 and 13 adjacent cross-bars 17a, 17b and 17c, respectively, by nuts 40 and bolts 41 (see FIG. 6) and are rotatable from a folded position aligned with and within legs 12 and 13 as seen in FIGS. 3 and 3A to a horizontal, unfolded, open position as seen in FIGS. 1, 1A and 1B. As seen in the Figures each rack 18 is flat and rectangular with sides 19, 20, 21 and 22 and with two openings 23 and 24. Each such opening is smaller in diameter than the diameter of a bowling ball to form on the periphery of each opening a seat or pocket for a bowling ball. Another non-functional or decorative opening 25 is provided between openings 23 and 24. Sides 19 and 21 of rack 18 extend beyond side 22 to form extension stops 30 and 31 that engage the underside of cross-bars 17a, 17b and 17c when top rack 18a, intermediate rack 18b and bottom rack 18c, respectively, are unfolded outwardly to the horizontal position to stop further rotation of racks 18 as seen in FIGS. 1 and 1A. Thus, top rack 18a is positioned adjacent cross-bar 17a which functions to prevent further downward rotation of rack 18a. Intermediate rack 18b is positioned adjacent cross-bar 17b which functions to prevent further downward rotation of rack 18b and bottom rack 18c is positioned adjacent cross-bar 17c to stop further downward rotational movement of rack 18c. As seen in FIGS. 1, 1A and 1B, racks 18a, 18b and 18c extend forward in open position in a horizontal plane when legs 12 and 13 are tilted rearwardly.

Figure 7:
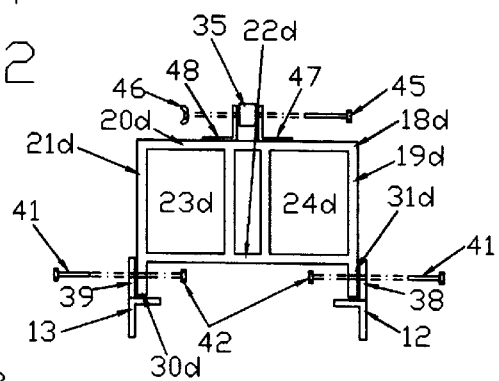
FIG. 7 is a top view of the rearward rack in the open position.
Figure 2A:
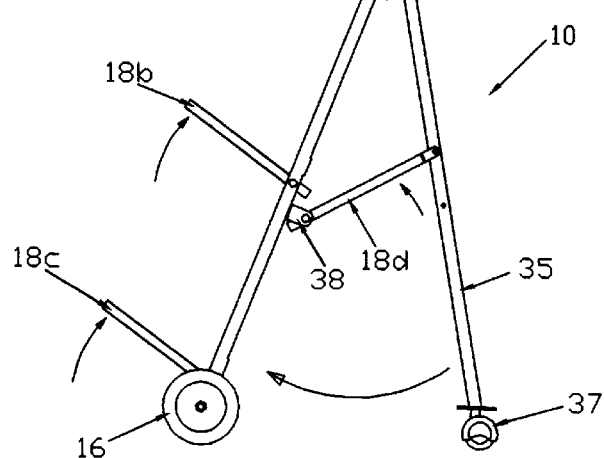
FIG. 2A is a schematic side view of the bowling caddy shown in FIG. 2.

The upper end of a third longitudinally and generally vertically extending (rear) leg 35 is connected to the center of cross-bar 17a by a swivel 36 and the bottom of leg 35 is connected to a swivel ball 37 (see FIGS. 1, 1A, 2, 2A and 3A). Rear rack 18d is similar to racks 18a, 18b and 18c and has sides 19d, 20d, 21d and 22d and openings 23d and 24d. As seen in FIG. 7, the center or middle of side 20d of rear rack or shelf 18d is releasably pinned by bolt 45 and wing nut 46 to rear leg 35 at a preselected point along the length of leg 35 and when pinned bolt 45 extends through openings in lugs 47 and 48 mounted on side 20d. Extensions 30d and 31d of sides 19d and 21d of rack 18d are connected to lugs 38 and 39 which are attached to legs 12 and 13, respectively. The selected point chosen for pinning rack 18d to leg 35 is such that with legs 12 and 13 tilted backwardly and leg 35 extending backwardly at a predetermined angle to form a tripod and with rack 18d pinned to leg 35 and racks 18 unfolded to open positions each of the racks are level and horizontally extending in a stepwise configuration as shown in the Figures.

In using this bowling caddy with racks 18 and 18d and leg 35 in their folded positions, as shown in FIGS. 3, 3A, 4 and 5, legs 12 and 13 are tilted back at an angle to the vertical, racks 18a, 18b, and 18c rotated downwardly to their unfolded horizontal, forward positions, swivel leg 35 is pivoted outwardly at an angle to legs 12 and 13 and rack 18d is rotated downwardly to its unfolded horizontal, rear position and pinned to leg 35, as shown in FIGS. 1, 1A and 1B. As desired, one or more bowling balls are then seated on seat openings 23, 24, 23d, and 24d of the racks 18 and 18d. When the bowling caddy is to be folded for storage or travel the bowling ball(s) are removed from the racks, front racks 18a, 18b, and 18c are rotated upwardly into alignment with legs 12 and 13 and rack 18d is unpinned from leg 35 and rotated upwardly and leg 35 is pivoted downwardly to their folded positions adjacent legs 12 and 13.

The support legs are preferably constructed of square steel tubing for strength and durability. The racks are preferably made of steel and for an attractive appearance and protection each rack frame may be plastic coated. The dimensions of the caddy for carrying up to eight bowling balls or bags suitably may be 45 inches in height, 24 inches wide and 40 inches deep when opened or unfolded and 50 inches in height, 14 inches wide and 6 inches deep when unopened or folded. With dimensions and using steel construction material the total weight of the caddy, folded or unfolded, is about 35 pounds.

In summary, significant features of this bowling caddy are: the swivel wheel-tripod design provides excellent maneuvering capability; the bowling caddy is capable of carrying eight bowling balls or four double bowling ball bags or any combination thereof; the racks, when unfolded, form a stair step form that provides unobstructed visual and physical access to equipment on each rack; the bowling caddy can be moved over almost any surface; and, when folded, the bowling caddy is easily carried and stored.

The invention encompasses using the caddy for purposes other than bowling ball transport and storage. Further, changes and modifications in the form, size and materials of construction can be made without departing from the scope of the invention as defined in the appended claims.

What is claimed is:

1. Transporting apparatus comprising:

two spaced apart, parallel and longitudinally extending tubular legs;

longitudinally spaced apart cross-bars connecting said two legs;

a third leg pivotally connected at one end to one of said cross-bars and pivotal from a first closed position adjacent said two parallel legs to a second open position at an angle to said two parallel legs to form a tripod with said two parallel legs;

at least one flat rack pivotally connected to said two parallel legs and independently rotatable in one direction to and from a first position aligned with a plane formed by said two parallel legs to and from a second horizontally extending position; and another flat rack pivotally connected to said two parallel legs and releasably pinned to said third leg and independently rotatable in an opposite direction from a first unpinned position adjacent said two legs to a second pinned horizontally extending position when said third leg is in said second open position.

2. Apparatus as recited in claim 1 including three spaced apart flat racks each rotatable in one direction from a first position aligned with a plane formed by said two parallel legs to a second horizontally extending position.

3. Apparatus as recited in claim 2 in which said two parallel legs extend generally vertically and each of said three racks is connected to said two parallel legs adjacent a different one of said cross-bars and including means on each rack cooperating with a cross-bar to prevent rotation of said rack beyond its horizontal position.

4. Apparatus as recited in claim 3 in which said three racks rotate in a forward direction and said other rack rotates in a rearward direction.

5. Apparatus as recited in claim 4 in which said two parallel legs tilt in a rearward direction.

6. Apparatus as recited in claim 4 including two bowling ball seats formed on each rack.

7. Apparatus as recited in claim 5 including means mounted on the lower end of said third leg and means mounted on the lower end of each of said two parallel legs to facilitate movement of said apparatus.

8. Apparatus as recited in claim 7 in which said rearward rotating rack is pinned to said third leg at a selected point whereby said rearward rotating rack extends horizontally when said third leg is in the second position thereof.

9. Apparatus for transporting and storing bowling balls comprising:

two tubular, parallel, spaced apart, generally vertically extending legs;

a third leg pivotally connected at one end to an upper portion of said apparatus and pivotal from a first position adjacent said two parallel legs to a second position at an angle to a plane formed by said two parallel legs to form a tripod;

means mounted on the other end of said third leg and means connected to the lower ends of said two parallel legs to facilitate movement of said apparatus;

three vertically spaced apart racks rotatably attached between and to said two parallel legs with each independently rotatable to and from a first position aligned with said two parallel legs to and from a second position extending in one horizontal direction;

a plurality of parallel, spaced apart cross-bars connecting said two parallel legs;

a fourth rack rotatably connected to said parallel legs and rotatable to and independently from a first position extending along and adjacent to said two parallel legs to and from a second position extending in an opposite horizontal direction when said third leg is in said second position; and means on each rack for seating at least one bowling ball.

10. Apparatus as recited in claim 7 in which said fourth rack and said third leg are releasably pinned together when said fourth rack and said third leg are in their second positions.

11. Apparatus as recited in claim 8 in which said means mounted on the other end of said third leg comprises a swivel ball and said means connected to the lower ends of said two parallel legs comprise wheels.

12. Apparatus as recited in claim 9 in which said means for seating at least one bowling ball comprises an opening in said rack.

13. A bowling caddy comprising:

two tubular steel, parallel, spaced apart, generally vertically extending support legs;

a steel handle connecting the upper ends of said two parallel legs;

a plurality of vertically spaced apart cross-bars connecting said two legs;

a generally vertically extending third leg pivotally connected at an upper end to an upper cross-bar and pivotal from a first closed position adjacent said two parallel legs to a second open position at an angle to a plane formed by said two parallel legs to form a tripod with said two parallel legs;

three spaced apart flat racks pivotally connected to said two parallel legs and each independently rotatable in one lateral direction from a first position aligned with the plane of said two parallel legs to and from a second horizontally extending position;

another flat rack pivotally connected to said two parallel legs and releasably pinned to said third leg and independently rotatable in an opposite lateral direction to and from a first unpinned position adjacent said two parallel legs to and from a second pinned horizontally extending position when said third leg is in said second open position; and openings in said racks for seating bowling balls.

* * * * *